(12) United States Patent
Lai et al.

(10) Patent No.: US 6,529,642 B1
(45) Date of Patent: Mar. 4, 2003

(54) METHOD FOR ENLARGING/REDUCING DIGITAL IMAGES

(75) Inventors: Cheng-Shing Lai, Taipei (TW); Jie-Cai Han, Nanjing (CN)

(73) Assignee: Inventec Electronics (Nanjing) Co., Ltd., Nanjing (CN)

( * ) Notice: Subject to any disclaimer, the term of this patent is extended or adjusted under 35 U.S.C. 154(b) by 0 days.

(21) Appl. No.: 09/393,193

(22) Filed: Sep. 10, 1999

(51) Int. Cl.$^7$ ................................................ G06K 9/32
(52) U.S. Cl. ........................................ 382/298; 358/528
(58) Field of Search ............................... 382/298, 299, 382/277; 358/528; 345/660, 667, 669, 670, 671

(56) References Cited

U.S. PATENT DOCUMENTS

| | | | |
|---|---|---|---|
| 3,976,982 A | * 8/1976 | Eiselen | 382/284 |
| 4,610,026 A | * 9/1986 | Tabata et al. | 382/300 |
| 4,764,975 A | * 8/1988 | Inoue | 382/299 |
| 5,113,455 A | * 5/1992 | Scott | 382/298 |

* cited by examiner

*Primary Examiner*—Von J. Couso
(74) *Attorney, Agent, or Firm*—Birch, Stewart, Kolasch & Birch, LLP

(57) ABSTRACT

This invention relates to a method for enlarging/reducing digital images, which carries out the image scale conversion processing uniformly and smoothly according to the regional mapping method to create the mutual positional relation within the reference frame between the pixels of an original image and the pixels of a new image. By using this method, each of the new image pixels and the corresponding region of the original image pixels can be determined, moreover, the average method or the interpolation method can be used within this region to achieve the effect of scaling the digital images on a computer display or the device having a LCD display uniformly and smoothly without having the mosaic effect while enlargement and deformity while reduction. The image scale conversion processing can also be achieved at a high speed.

11 Claims, 4 Drawing Sheets

FIG. 2

| $g_{0,0}$ | $g_{0,1}$ | $g_{0,2}$ |
|---|---|---|
| $g_{1,0}$ | $g_{1,1}$ | $g_{1,2}$ |
| $g_{2,0}$ | $g_{2,0}$ | $g_{2,2}$ |

FIG. 1

| $f_{0,0}$ | $f_{0,1}$ | $f_{0,2}$ | $f_{0,3}$ | $f_{0,4}$ | $f_{0,5}$ | $f_{0,6}$ |
|---|---|---|---|---|---|---|
| $f_{1,0}$ | $f_{1,1}$ | $f_{1,2}$ | $f_{1,3}$ | $f_{1,4}$ | $f_{1,5}$ | $f_{1,6}$ |
| $f_{2,0}$ | $f_{2,1}$ | $f_{2,2}$ | $f_{2,3}$ | $f_{2,4}$ | $f_{2,5}$ | $f_{2,6}$ |
| $f_{3,0}$ | $f_{3,1}$ | $f_{3,2}$ | $f_{3,3}$ | $f_{3,4}$ | $f_{3,5}$ | $f_{3,6}$ |
| $f_{4,0}$ | $f_{4,1}$ | $f_{4,2}$ | $f_{4,3}$ | $f_{4,4}$ | $f_{4,5}$ | $f_{4,6}$ |

| $g_{0,0}$ | $g_{0,1}$ | $g_{0,2}$ | $g_{0,3}$ | $g_{0,4}$ | $g_{0,5}$ | $g_{0,6}$ | $g_{0,7}$ | $g_{0,8}$ | $g_{0,9}$ |
|---|---|---|---|---|---|---|---|---|---|
| $g_{1,0}$ | $g_{1,1}$ | $g_{1,2}$ | $g_{1,3}$ | $g_{1,4}$ | $g_{1,5}$ | $g_{1,6}$ | $g_{1,7}$ | $g_{1,8}$ | $g_{1,9}$ |
| $g_{2,0}$ | $g_{2,1}$ | $g_{2,2}$ | $g_{2,3}$ | $g_{2,4}$ | $g_{2,5}$ | $g_{2,6}$ | $g_{2,7}$ | $g_{2,8}$ | $g_{2,9}$ |

FIG. 4

| $t_{0,0}$ | $t_{0,1}$ | $t_{0,2}$ | $t_{0,3}$ | $t_{0,4}$ | $t_{0,5}$ | $t_{0,6}$ |
|---|---|---|---|---|---|---|
| $t_{1,0}$ | $t_{1,1}$ | $t_{1,2}$ | $t_{1,3}$ | $t_{1,4}$ | $t_{1,5}$ | $t_{1,6}$ |
| $t_{2,0}$ | $t_{2,1}$ | $t_{2,2}$ | $t_{2,3}$ | $t_{2,4}$ | $t_{2,5}$ | $t_{2,6}$ |

METHOD FOR ENLARGING/REDUCING DIGITAL IMAGES

BACKGROUND OF THE INVENTION

1. Field of Invention

This invention relates to a method of digital image processing, which particularly relates to the image processing for enlarging/reducing digital images on a computer display or the device having a LCD display uniformly and smoothly.

2. Related Art

When the image on the computer display is too large or small to display or to be processed, then it may be necessary to be reduced or enlarged. For the raster image, it is made of a plurality of pixels. For example, the image on the display comprises a plurality of light pixels, and the versatile color combinations of pixels constitute the entire digital image. Since the number of pixels in an image is fixed and finite, the process for enlarging, reducing or rotating the image may effect its resolution and come into image distortion. Generally, the image scale conversion processing of a digital image is carried out by deleting or inserting the image pixels uniformly. But, if the enlargement or reduction processing of a digital image is just simply carried out by inserting the most adjacent pixels or deleting pixels without advanced processing, then the resulted images will inevitably be involved with the mosaic effect or deformity.

Consequently, for processing the image scale conversion on a gray-scale or a full color digital image, the bilinear interpolation method or the high-order interpolation method is commonly used to improve the conversion effect. However, the former will still have the mosaic effect or deformity for the high frequency images, and the latter is unsuitable for high speed processing.

BRIEF DESCRIPTION OF THE INVENTION

To overcome the effects mentioned above, the object of the present invention provides a method capable of enlarging/reducing digital images uniformly and smoothly. The image scale conversion processing can also be achieved at a high speed.

According to the above objective of the present invention, the proposed image scale conversion processing of digital images can be briefly described in the following two steps.

(1) Determine the positional coordinates of each of the new image pixels and the corresponding region of the original image pixels within the reference frame. The process is carried out based on the regional mapping method according to magnifications of the image scale conversion on the original image on horizontal direction and vertical direction to convert the positional coordinates of each original image pixel (referred to hereinafter as function f) to the positional coordinates of the new image pixels (referred to hereinafter as function g), respectively.

(2) Determine the data values of the new image pixels after the image scale conversion processing. For the reduction process, portions of the original image pixels are discarded without mapping to the new image, and the data value of the new image pixel g is calculated from the average value of the original image pixel f, In addition, the pixels adjacent to the pixel f are not mapped to the new image. Whereas the pixels mapped to the pixel g constitutes a rectangular region in the original image, in which pixel f is placed at the upper-left point. For the enlargement processing, parts of the new image pixels are not mapped from the original image pixels but the additional pixels. Each rectangular region, comprising of four adjacent pixels of the original image, are mapped to a larger rectangular region in the new image (the vertical and horizontal length are assumed to be W and H, respectively). Of which the data values of the new image pixels are calculated based on the four original image pixels using the method similar to the interpolation and are calculated on principle inversely proportional to the distance. The practical calculation is carried out in detail as follow:

1. Sequentially calculate the vertical and horizontal distances dx and dy between one of the new image pixels in the rectangular region and each of the corners of the rectangular region, respectively.
2. Use the value of (W−dx)+(H−dy) as a weight to calculate the weighted average data values of the new image pixels based on the four original image pixels within the square region to obtain the data value of such pixel.
3. Similarly calculate the data values of the other pixels in the rectangular region from the first step.

Accordingly, if a digital image is subjected to reduction or enlargement on horizontal and vertical directions, the resulting image can be easily obtained according to the prior art. However, consider a situation in which a digital image is subjected to reduction on horizontal direction and enlargement on vertical direction, or it is subjected to enlargement on horizontal direction and reduction on vertical direction. Under this situation, a temporary image constructed form the original image must be produced according to the magnification of the image scale conversion on the horizontal direction while the magnification on the vertical direction is kept in unity. Consequently, using the similar procedure mentioned above, the new image could be constructed from the temporary image according to the magnification of the image scale conversion on vertical direction while the magnification on the horizontal direction is kept in unity.

Certainly, the processing sequence of the image scale conversion on horizontal direction and vertical direction can be altered, and similarly the processing order of enlargement and reduction can also be altered.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow illustration only, and thus are not limitative of the present invention, and wherein:

FIG. 1 is a grid graph illustrating the local graph of the image pixels on a display;

FIG. 2 is a graph showing the new image resulting from a magnification of the original image of FIG. 1 with a horizontal direction magnification of 40% and a vertical direction magnification of 50%;

FIG. 3 is a graph showing the new image resulting from a magnification of the original image of FIG. 1 with a horizontal direction magnification of 320% and a vertical direction magnification of 200%;

FIG. 4 is a graph showing a temporary image resulting from a magnification of the original image of FIG. 1 with a vertical direction magnification of 60% and a horizontal direction magnification of 160%;

FIG. 5 is a graph showing the new image resulting from the temporary image of FIG. 4, which is resulted from a magnification of the original image of FIG. 1 with a vertical direction magnification of 60% and a horizontal direction magnification of 160%.

DETAILED DESCRIPTION OF THE INVENTION

Figure 6:
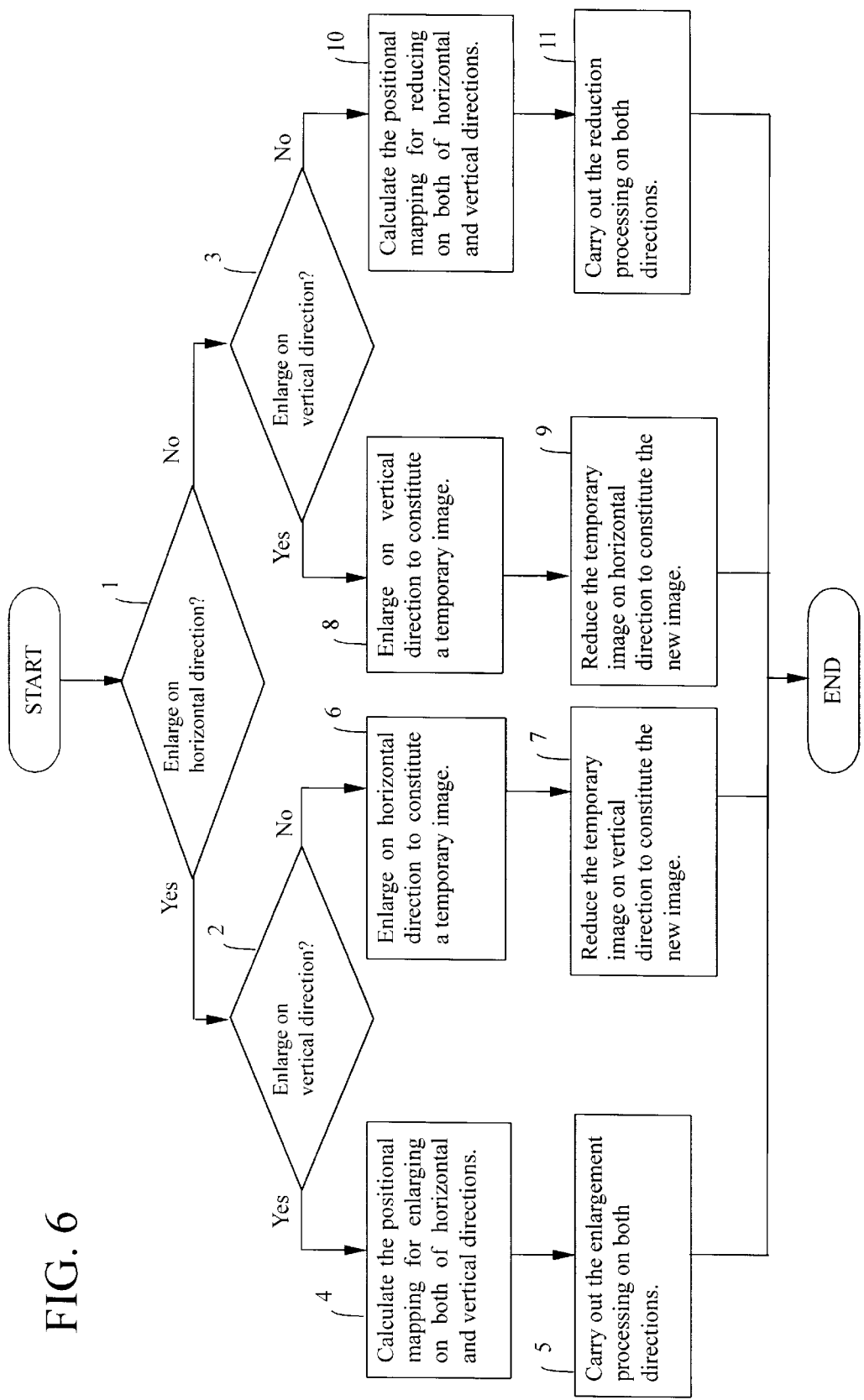
FIG. 6 is a flowchart of the image scale conversion processing according to the present invention.

The processing procedure of the image scale conversion according to the present invention can be described as following two steps:

(1) Calculate the mutual positional relation within the reference frame between the original image pixels and the new image pixels; and (2) Calculate the data value of each of the new image pixels after the image scale conversion processing.

For the reduction process, the data value of each of the new image pixels can be calculated from the average value of the corresponding rectangular region of the original image pixels.

For the enlargement process, the data value of each of the new image pixels can be calculated from the weighted average value of the corresponding square region of the original image pixels on principle of being inversely proportional to the distance between such new image pixel and the corners of the corresponding rectangular region.

Figure 3:
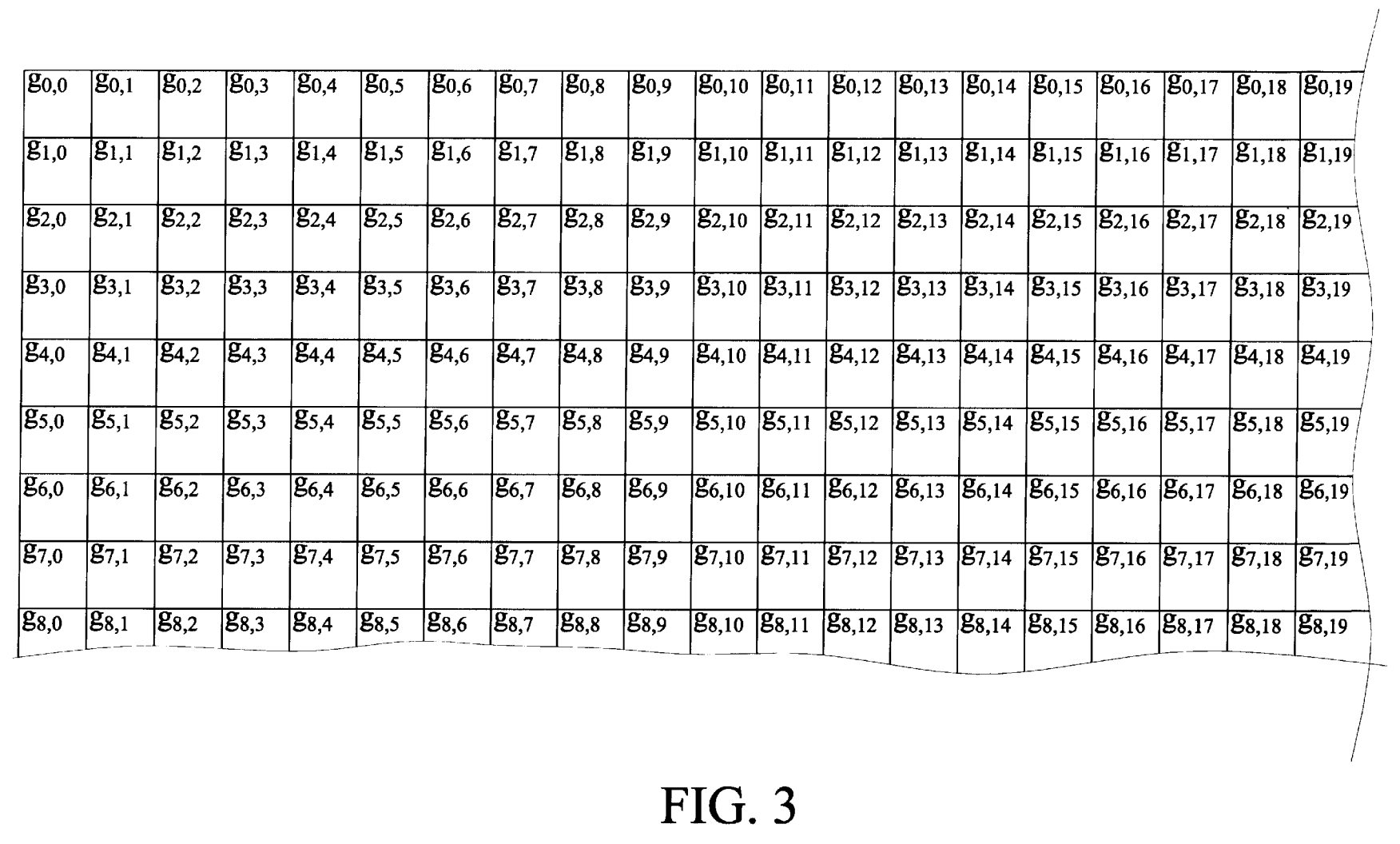

Thereafter, detailed description accompanied with FIG. 1 to FIG. 5 of the mutual positional relation within the reference frame between the new image pixels and the original image pixels according to the present invention are given, moreover, calculation of the data values of the new image pixels is also presented.

First of all, detailed description of the terms in the figures is given as below:

$f(i,j)$, wherein $i=0, 1, \ldots, M-1$, and $j=0, 1, \ldots, N-1$, stands for the data value of the original image pixel in M rows and N columns, and is presented as $f_{i,j}$ in the figures.

$g(x,y)$, wherein $x=0, 1, \ldots, R-1$, and $y=0, 1, \ldots, S-1$, stands for the data value of the new image pixel in R rows and S columns, and is presented as $g_{i,j}$ in the figures.

The term, per, stands for the enlargement/reduction magnification of the image scale conversion process between the original image and the new image.

The first step of calculation is as follows.

Calculate the mutual positional relation within the reference frame between the original image pixels and the new image pixels.

x=integer part of (i*per)
y=integer part of (j*per)

The second step of calculation is as follows.

Calculate the data value of each of the new image pixels according to the mapping relation mentioned above.

For the reduction process, each of the new image pixels should be mapped from a corresponding pixel of the original image. By using this pixel as the upper-left point, such pixel and the pixels adjacent thereto but being not mapped to the new image will constitute a rectangular region. Therefore, the data value of each of the new image pixel can be calculated from the average value of the pixels within the rectangular region.

For the enlargement process, each of the original pixels are mapped to a corresponding pixel of the new image. Each square region comprising four adjacent pixels of the original image is mapped to a larger rectangular region in the new image, wherein the data values of the new image pixels are calculated on the basis of the four adjacent pixels using the method similar to interpolation and are calculated on principle of being inversely proportional to the distance. To produce more pixels on the basis of the four adjacent pixels, it is necessary to take some measures to prevent the data values of the produced pixels from being the same as that of the original pixels, and to show the aspects of the original image at the same time. The proposed method according to the present invention is carried out through the following steps:

(1) Calculate the vertical and horizontal lengths of the resulting rectangular region (supposed to be W and H, respectively), and the vertical and horizontal distances dx and dy between one of the new image pixels in the rectangular region and each of the corners of the rectangular region.

(2) By using the value of (W−dx)+(H−dy) as a weighing, calculate the data value of such new image pixel from the weighted average values of the four original image pixels within the corresponding square region.

(3) Similarly calculate the data values of the other pixels in the rectangular region from the first step.

If a digital image is subjected to reduction on one direction and enlargement on the other direction, it should be processed sequentially on each direction. For example, scale the original image on horizontal direction at first to obtain a temporary image, and then scale the temporary image on vertical direction to obtain the new image.

Practical calculation for reducing on horizontal and vertical directions is shown as follow.

With reference to FIG. 1 and FIG. 2, the original image in FIG. 1 is subjected to reduction with a horizontal direction magnification of 40% and a vertical direction magnification of 50% to constitute the new image in FIG. 2.

According to the first step of the calculation in the prior art, the positional coordinates of the original image pixels are given as follows:

(0,0), (0,3), (0,5), (2,0), (2,3), (2,5), (4,0), (4,3), (4,5)

And the corresponding positional coordinates of the new image pixels are calculated as follows:

(0,0), (0,1), (0,2), (1,0), (1,1), (1,2), (2,0), (2,1), (2,2)

According to the second step of the calculation:

With reference to FIG. 1 and FIG. 2, the pixel g(0,0) is mapped from f(0,0), and the data value of g(0,0) can be calculated from the average value of pixels in the rectangular region comprising the pixels f(0,0), f(0,1), f(0,2), f(1,0), f(1,1), f(1,2), wherein f(0,0) is the upper-left point of the rectangle and the other pixels will not be mapped to the new image. Therefore, $g(0,0)=(f(0,0)+f(0,1)+f(0,2)+f(1,0)+f(1,1)+f(1,2))/6;$ $g(0,1)=(f(0,3)=f(0,4)+f(1,3)+f(1,4))/4;$ $g(1,0)=(f(2,0)=f(2,1)+f(2,2)+f(3,0)+f(3,1)+f(3,2))/6;$ and $g(1,1)=(f(2,3)=f(2,4)+f(3,3)+f(3,4))/4.$ Similarly the other pixels of the new image can also be calculated in the same way.

Practical calculation for enlarging on horizontal and vertical directions is shown as follows.

With reference to FIG. 1 and FIG. 3, the original image in FIG. 1 is subjected to enlargement with a horizontal direction magnification of 320% and a vertical direction magnification of 200% to constitute the new image in FIG. 2.

According to the first step of calculation in the prior art. The positional coordinates of the original image pixels are given as follows:

(0,0), (0,1), (0,2), (1,0), (1,1), (1,2), (2,0), (2,1), (2,2)

And the corresponding positional coordinates of the new image pixels are calculated as follows:

(0,0), (0,3), (0,6), (2,0), (2,3), (2,6), (4,0), (4,3), (4,6)

According to the second step of calculation:

The four pixels of f(0,0), f(0,1), f(1,0), f(1,1) of the original image are mapped to four rectangular regions, in which the upper-left points are g(0,0), g(0,3), g(2,0), and g(2,3), respectively. For the sake of simplicity, only calculation of g(0,0), g(0,1), g(0,2), g(1,0), g(1,1), and g(1,2) are shown as follows, wherein W=2 and H=3.

For pixel g(1,1), the distances between g(0,0), which is mapped from f(0,0), are dx=1 and dy=1, respectively, and the distances between g(0,3), which is mapped from f(0,1), are dx=1, dy=2, and the distances between g(2,0), which is mapped from f(l,0), are dx=1, dy=1, and the distances between g(2,3), which is mapped from f(1,1), are dx=1, dy=2. therefore, $g(1,1)=(f(0,0)*((2-1)+(3-1))+f(0,1)*((2-1)+(3-2))+f(1,0)*((2-1)+(3-1))+f(1,1)*((2-1)+(3-2)))/(((2-1)+(3-1))+((2-1)+(3-2))+((2-1)+(3-1))+((2-1)+(3-2)));$ $g(0,0)=(f(0,0)*((2-0)+(3-0))+f(0,1)*((2-0)+(3-3))+f(1,0)*((3-0)+(2-2))+f(1,1)*((2-2)+(3-3)))/(((2-0)+(3-0))+((2-0)+(3-3))+((3-0)+(2-2))+((2-2)+(3-3)));$ $g(0,1)(f(0,0)*((2-0)+(3-1))+f(0,1)*((2-0)+(3-2))+f(1,0)*((2-2)+(3-1))+((2-2)+(3-1))+((2-2)+(3-2)));$ $g(0,2)=(f(0,0)*((2-0)+(3-2))+f(0,1)*((2-0)+(3-1))+f(1,0)*((2-2)+(3-2))+f(1,1)*((2-2)+(3-1)))/(((2-0)+(3-2))+((2-0)+(3-))+(2-2)+(3-2))+((2-2)+(3-)));$ $g(1,0)$ $(f(0,0)*((2-1)+(3-0))+f(0,1)*((2-1)+(3-3))+f(1,0)*((2-1)+(3-0))+f(1,1)*((2-1)+(3-1)))/(((2-1)+(3-0))+((2-1)+(3-3))+((2-1)+(3-0))+(2-1)+(3-3)));$ and $g(1,2)=(f(0,0)*((2-1)+(3-2))+f(0,1)*((2-1)+(3-1))+f(1,0)*((2-1)+(3-2))+f(1,1)*((2-1)+(3-1)))/(((2-1)+(3-2))+((2-1)+(3-1))+((2-1)+(3-2))+((2-1)+(3-1))).$ Similarly, the other pixels of the new image can also be calculated in the same way.

Practical calculation for enlarging on one direction and reducing on the other direction is shown as follows:

With reference to FIG. 1, FIG. 4, and FIG. 5, the original image in FIG. 1 is subjected to reduction with a vertical direction magnification of 60% and enlargement with a horizontal direction magnification of 160% to constitute the FIG. 5, and FIG. 4 is the temporary image.

First of all, the original image should be reduced with a vertical direction magnification of 60% while the horizontal direction magnification is kept in unity to constitute the temporary image t(x',y').

According to the first step of calculation, the positional coordinates of the original image pixels are shown as follows:

(0,0), (0,1), (0,2), (2,0), (2,1), (2,2), (4,0), (4,1), (4,2)

And the corresponding positional coordinates of the new image pixels are calculated as follows:

(0,0), (0,1), (0,2), (1,0), (1,1), (1,2), (2,0), (2,1), (2,2)

According to the second step of calculation, calculate the average value of the corresponding pixels on vertical direction to obtain the data values of new image pixels.

$t(0,0)=(f(0,0)+f(1,0))/2$ $t(0,1)=(f(0,1)+f(1,1))/2$ $t(1,0)=(f(2,0)+f(3,0))/2$ $t(1,1)=(f(2,1)+f(3,1))/2$

Similarly the other pixels of the new image can also be calculated in the same way.

Follow the above procedure, the temporary image should be enlarged with a horizontal direction magnification of 160% while the vertical direction magnification is kept in unity to constitute the new image g(x,y) as shown in FIG. 5.

According to the first step of calculation, the positional coordinates of the original pixels are shown as follows:

(0,0), (0,1), (0,2), (1,0), (1,1), (1,2), (2,0), (2,1), (2,2)

And the corresponding positions of the new image pixels are calculated as follows:

(0,0), (0,1), (0,3), (1,0), (1,1), (1,3), (2,0), (2,1), (2,3)

According to the second step of calculation:

$g(0,0)=(t(0,0)*((1-0)+(1-0))+t(0,1)*((1-0)+(1-1))+t(1,0)*((1-1)+(1-0))+t(1,1)*((1-1)+(1-1)))/(((1-0)+(1-0))+((1-0)+(1-1))+((1-1)+(1-0))+((1-1)+(1-1)))$ $g(0,1)=(t(0,1)*((1-0)+(2-0))+t(0,2)*((1-0)+(2-2))+t(1,1)*((1-1)+(2-0))+t(1,2)*((1-1)+(2-2)))/(((1-0)+(2-0))+((1-0)+(2-2))+$ $$((1-1)+(2-0))+((1-1)+(2-2)))$$

$$g(0,2)=(t(0,1)*((1-0)+(2-1))+t(0,2)*((1-0)+(2-1))+t(1,1)*((1-1)+(2-1))+t(1,2)*((1-1)+(2-1)))/(((1-0)+(2-1))+((1-0)+(2-1))+((1-1)+(2-1))+((1-1)+(2-1))))$$

$$g(1,0)=(t(1,0)*((1-0)+(1-0))+t(1,1)*((1-0)+(1-1))+t(2,0)*((1-1)+(1-0))+t(2,1)*((1-1)+(1-1)))/(((1-0)+(1-0))+((1-0)+(1-1))+((1-1)+(1-0))+((1-1)+(1-1))))$$

Similarly the other pixels of the new image can also be calculated in the same way.

Finally, with reference to FIG. 6, the flowchart of the image scale conversion processing according to the present invention is described as follows:

Step 1: In the beginning of the image processing, check whether or not the original image is enlarged on the horizontal direction. Regardless of enlargement or reduction on horizontal direction, continue to check whether the original image is enlarged on vertical direction.

Step 2, 3: Confirm whether or not the original image is enlarged or reduced on the vertical direction.

Step 4: If the original image is enlarged on the horizontal and vertical directions, then calculate the mutual positional relations within the reference frame between the original image pixels and the new image pixels for enlarging on both directions.

Step 5: Carry out the enlargement process on horizontal and vertical directions.

Step 6: If the original image is enlarged on horizontal direction and reduced on vertical direction, then enlarge the original image on horizontal direction at first to constitute a temporary image.

Step 7: According to step 6, carry out the reduction process on vertical direction based on the temporary image to constitute the new image.

Step 8: If the image is reduced on horizontal direction and enlarged on vertical direction, then enlarge the image on vertical direction at first to constitute a temporary image.

Step 9: According to step 8, carry out the reduction process on horizontal direction based on the temporary image to constitute the new image.

Step 10: If the image is reduced on horizontal and vertical directions, then calculate the mutual positional relations within the reference frame between the original image pixels and the new image pixels for reducing both directions.

Step 11: Carry out the reduction process on horizontal and vertical directions.

The detailed calculation of enlargement and reduction processes has been described before.

While the above is a complete description of the preferred embodiments of the present invention, various alternatives, modifications and equivalents may be used. Such variations are not to be regarded as a departure from the spirit and scope of the invention, and all such modifications or equivalents as would be obvious to one skilled in the art are intended to be included in the scope of the following claims. For example, according to the present invention, the positional coordinates of each of the new image pixels is obtained from the integer part of the value calculated from multiplying the positional coordinates of the corresponding original image pixel by the magnifications of the image scale conversion. Certainly, rounding off or carry-in without preconditions can also be used to calculate the positional coordinates of the new image pixels. Furthermore, the pixels chosen for calculating the average value for the reduction process can also be chosen from another methods, and similarly for the enlargement process. Moreover, if the original image is subjected to reduction on horizontal direction and enlargement on vertical direction, or it is subjected to enlargement on horizontal direction and reduction on vertical direction, the processing order of the image scale conversion on horizontal direction and vertical direction can be altered, and similarly the processing order of enlargement and reduction can be altered, too.

What is claimed is:

1. A method for enlarging/reducing digital images, which is used to carry out the enlargement processing of the image scale conversion on horizontal direction and vertical direction for a raster image on a display, which comprises the steps of:

providing a enlargement magnification;

obtaining a plurality of pixels of the image;

sequentially obtaining the positional coordinates of each of new pixels which are mapped from the positional coordinates of a corresponding pixel of the pixels according to the enlargement magnifications on each horizontal and vertical direction of the display respectively;

sequentially obtaining a rectangular region corresponding to the new pixels according to a mapping rectangular region including four adjacent pixels;

sequentially calculating the value of each of pixels within the rectangular region without being mapped from the mapping rectangular region from a weighted average values of the four adjacent pixels; and constituting a new image including the new pixels and the pixels within the rectangular region without being mapped from the pixels.

2. The method for enlarging/reducing digital images of claim 1 wherein the positional coordinates of the new pixel are obtained from the integer part of the value calculated from multiplying the positional coordinates of the pixel by the enlargement magnifications respectively.

3. The method for enlarging/reducing digital images of claim 1 wherein the positional coordinates of the new pixel are obtained from rounding off the value calculated from multiplying the positional coordinates of the pixel by the enlargement magnifications respectively.

4. The method for enlarging/reducing digital images of claim 1 wherein the length and the width of the rectangular region are defined as W and H respectively, and the vertical distance and the horizontal distance between one of the pixels within the rectangular region without being mapped from the mapping rectangular region and each of the four adjacent pixels of the mapping rectangular region are defined as (dx,dy) so that the weighted average value is calculated according to the four adjacent pixels by using (W−dx)+(H−dy) as a weight.

5. A method for enlarging/reducing digital images, which is used to carry out reduction process on a first direction and enlargement processing on a second direction for a raster image on a display, which comprises the steps of:

providing a reduction magnification and a enlargement magnification respectively;

obtaining a plurality of pixels of the image;

sequentially obtaining the positional coordinates of each of first new pixels, which are mapped from the positional coordinates of a corresponding pixel of the pixels according to the reduction magnification on the first direction while the reduction magnification of the second direction is kept in unity respectively;

sequentially calculating the data value of each of the first new pixels from the average value of the corresponding pixel and the surrounding pixels thereof without mapping to such new pixel;

constituting a temporary image including the first new pixels;

sequentially mapping the positional coordinates of each of the first new pixels to the positional coordinates of a second new pixel of a new image according to the enlargement magnification on the second direction while the enlargement magnification of the first direction is kept in unity respectively;

sequentially obtaining a rectangular region corresponding to the second new pixels according to a mapping rectangular region including four adjacent first new pixels;

sequentially calculating the value of each of pixels within the rectangular region without being mapped from the mapping rectangular region from a weighted average values of the four adjacent first new pixels; and constituting a new image including the second new pixels and the pixels within the rectangular region without being mapped from the first new pixels.

6. The method for enlarging/reducing digital images of claim 5 wherein the first direction is a horizontal direction and the second direction is a vertical direction of the display.

7. The method for enlarging/reducing digital images of claim 5 wherein the first direction is a vertical direction and the second direction is a horizontal direction of the display.

8. The method for enlarging/reducing digital images of claim 5 wherein the first direction coordinate of each of the first new pixels is obtained from the integer part of the value calculated from multiplying the positional coordinate of the corresponding pixel by the reduction magnification; and the positional coordinate of each of the second new pixels is obtained from the integer part of the value calculated from multiplying the second direction coordinate of the corresponding first new pixel by the magnification.

9. The method for enlarging/reducing digital images of claim 5 wherein the first direction coordinate of each of the first new pixels is obtained from rounding off the value calculated from multiplying the positional coordinate of the corresponding pixel by the reduction magnification, and the second direction coordinate of each of the second new pixels is obtained from rounding off the value calculated from multiplying the positional coordinate of the corresponding first new pixel by the magnification.

10. The method for enlarging/reducing digital images of claim 5 wherein the pixels used to calculate the average value constitutes a rectangular region, in which the corresponding pixel is placed at upper-left point.

11. The method for enlarging/reducing digital images of claim 5 wherein the length and the width of the rectangular region relative the second new pixels are defined as W and H respectively, and the second distance and the first distance between one of the pixels within the rectangular region without being mapped from the mapping rectangular region and each of the four adjacent pixels of the mapping rectangular region of the first new pixels are defined as (dx,dy) so that the weighted average value is calculated according to the four adjacent pixels by using (W−dx)+(H−dy) as a weight.

* * * * *